UNITED STATES PATENT OFFICE.

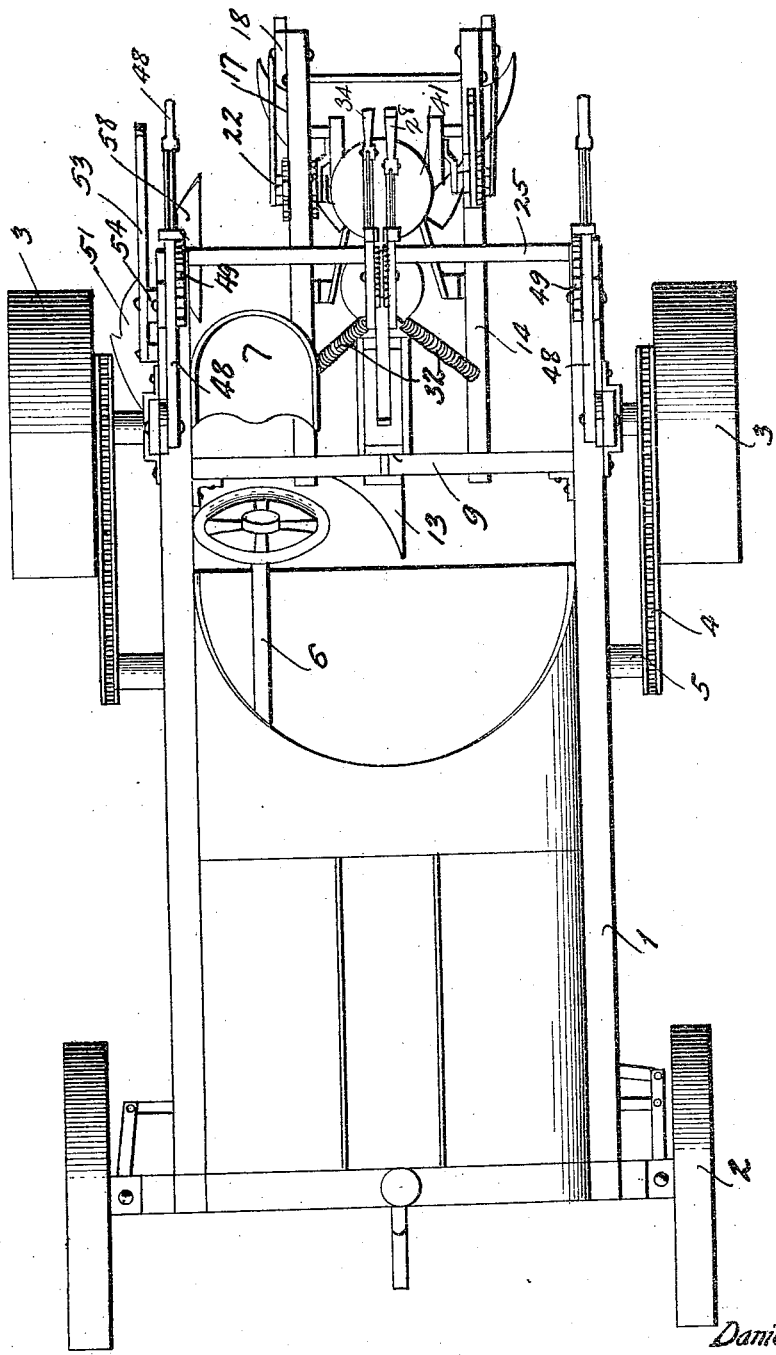

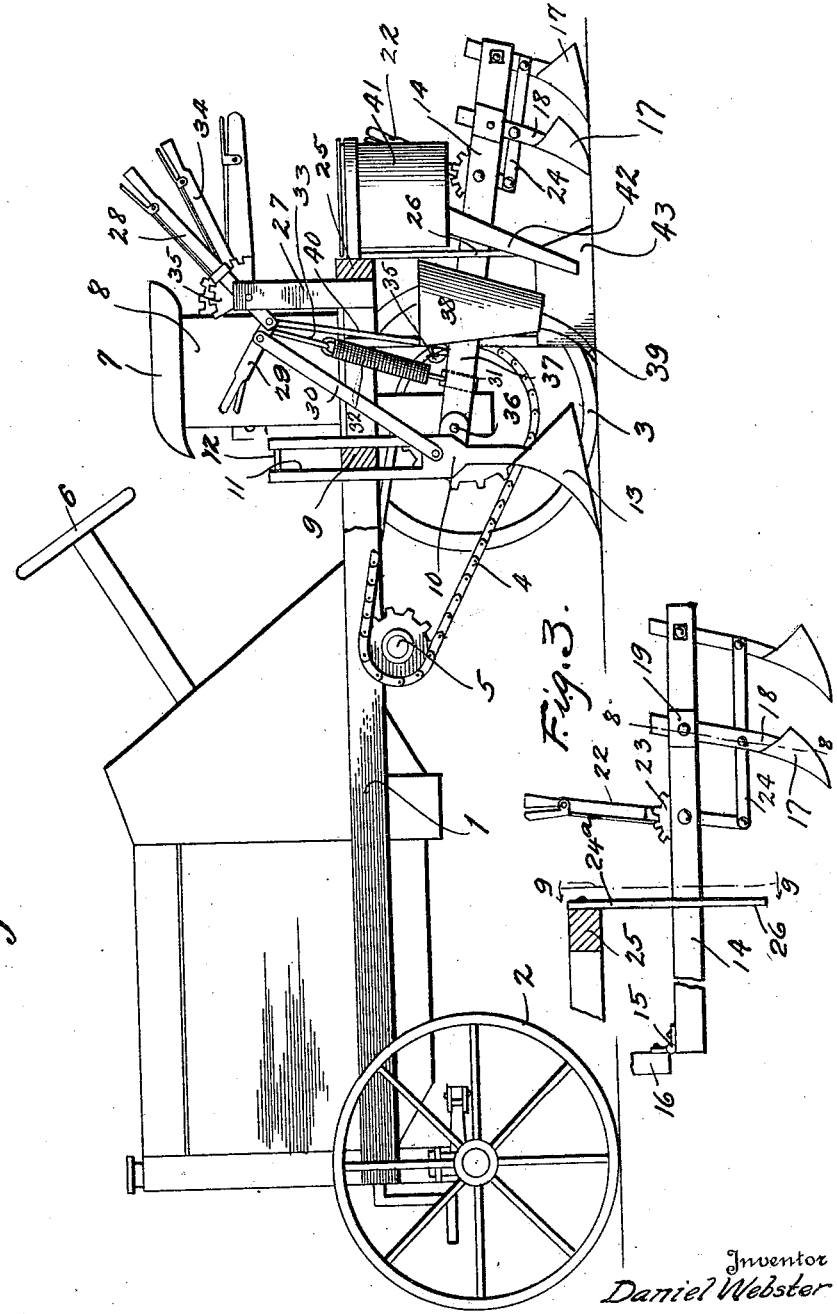

DANIEL WEBSTER, OF ABBOTT, TEXAS.

MOTOR PLOW.

1,413,437.  Specification of Letters Patent.  Patented Apr. 18, 1922.

Application filed January 26, 1918. Serial No. 213,900.

*To all whom it may concern:*

Be it known that I, DANIEL WEBSTER, a citizen of the United States, residing at Abbott, in the county of Hill and State of Texas, have invented certain new and useful Improvements in Motor Plows, of which the following is a specification.

This invention relates to motor plows, and has for its object the production of a simple and efficient means for facilitating the raising or lowering of the several plows supported upon the plow frame.

Another object of this invention is the production of a simple and efficient means for throwing the plow, harrow means, and planting devices to an inoperative position and allowing the device to be used as a tractor.

With these and other objects in view this invention consists in certain novel constructions, combinations, and arrangements of parts as will be hereinafter fully described and claimed.

In the drawings:—

Figure 1 is a top plan view thereof,

Figure 2 is a central longitudinal section through the rear portion of the plow with the forward portion thereof being shown in side elevation, Figure 3 is a longitudinal section through a portion of the plow frame showing the means for changing the pitch of the harrow blades or cultivator blades carried by the cultivator supporting arms or beams.

By referring to the drawings by numerals it will be seen that 1 designates the frame of the plow which is supported upon a plurality of forward wheels 2, and a plurality of rear driving wheels 3. The body or frame of the plow may be formed of the usual tractor type and may be formed of any suitable or desired construction for obtaining the desired results. The wheels 3 are driven by means of a plurality of sprocket chains 4 which chains are operated by means of a driving shaft 5 as shown in Figure 2. A suitable steering wheel 6 is carried upon the frame 1 and is located directly in front of the operator seat 7. The operator seat 7 is preferably mounted upon a fuel supply tank 8 as shown in Figure 2 of the drawings.

The frame 1 is provided with a transversely extending brace 9, and this brace 9 constitutes a support or guide for the plow supporting standard 10. This plow supporting standard 10 is provided with a bifurcated upper end 11 which bifurcated upper end 11 fits around the brace 9 thereby facilitating the guiding of the plow supporting standard 10 as the same is raised and lowered. A stop pin 12 is carried between the bifurcated outer end of the standard 10 for limiting the downward movement of the standard 10 upon the base 1. A suitable plow blade 13 of the desired construction is carried by the lower end of the plow supporting standard 10.

A pair of side beams or cultivator blade supporting arms 14 are secured at their forward ends to the hinges 15, which hinges are carried by the depending arms 16 carried by the brace 9. A cultivator blade 17 is supported upon each arm 14 near the rear thereof and upon opposite sides and these blades 17 are hung upon supporting arms 18, the arms 18 being carried by the pivoted bolt 19. These blocks 19 are provided with reduced ends 20, the reduced ends 20 being journaled within the arms 14 for the purpose of permitting the reduced ends 20 to rotate within the apertures 21, in this way permitting the angle of the cultivator blades 17 to be changed. An operating lever 22 is carried upon each side of each of the arms 14 and engages a plate 23 for the purpose of permitting the lever 22 to be held in a set position. The lower end of each lever 22 is connected to links 24 as shown in detail in Figure 7, the links 24 being connected to the cultivator supporting arm 18. It should be understood that a lever 22 is provided for the operation of the respective cultivator blades supported upon the opposite sides of the arms 14.

From the foregoing description it will be seen that the cultivator blades 17 may be tilted to a desired angle by the operation of the lever 22 and it should be understood that these blades may be individually operated due to the fact that each blade is operated by a separate operating lever 22 as shown in Figure 7.

A plurality of guiding plates 24ª are secured to the transversely extending rear guards 25 of the frame 1, and these guiding plates 24ª are provided with depending parallel arms 26, which are arranged in spaced relation for the purpose of constituting a guide for the cultivator blade supporting arms 14, these arms being adapted to extend between the parallel depending arms or fingers 26 of the guiding plates 24ᵃ. This structure is clearly shown in Figure 9 of the drawings.

A lever supporting standard 27 is supported upon the rear transversely extending bar 25 of the frame 1 and this standard 27 carries a lifting lever 28 and an operating lever 29, the operating lever 29 being connected to a link 30, the link 30 being in turn connected to the plow supporting standard 10. Each of the cultivator supporting arms 14 carries a yoke member 31 and each yoke member 31 is connected to coil springs 32, the coil springs 32 being in turn connected to the links 33, the links in turn being connected to the lower end of the lever 28 as shown in Figure 3 of the drawings. It should be understood that when it is so desired, the standard 10 may be raised and lowered by swinging the lever 29, the lever 29 being raised in a convenient position for operation of the driver of the machine who is mounted upon the seat 7. When it is desired to raise the cultivator supporting arms 14, the lever 28 may be swung upon the quadrant 35 thereby yieldably raising the arms 14 and throwing the cultivator blade 17 out of engagement with the ground.

A lever 34 is also pivotally mounted upon the standard 7 and this lever 34 engages the link 40 having a hooked lower end 35, the hooked lower end 35 engaging the planter supporting arm 37, which is pivotally supported as indicated at 36. A planter shoe 38 is carried by the planter supporting arm 37 and is adapted to deposit seed in the furrow which has been formed by the plow 13. By considering Figure 3, it will be seen that the planter 38 is raised and lowered to an inoperative position when it is so desired by swinging the lever 34. The planter 38 is provided with a planter discharge spout 39 as shown in Figure 3. Suitable covering plates 43 are extended upon the cultivator supporting arms 14 and are adapted to extend upon opposite sides of the planter spouts 39. These covering plates 43 are supported upon suitable supporting arms 44 carried by the arms 14 as shown in Figure 5 of the drawings. A suitable fertilizer supporting container 41 is supported in the rear of the frame 1, and is provided with a discharge spout 42 extending in the rear of the planter 38.

The wheels 3 may be adjusted to a suitable position for raising the cultivating, plowing and planting means out of engagement with the ground over which the motor plow is passing. It should be further understood that in view of the fact that each of the wheels 3 upon the opposite sides of the frame 1 is individually adjustable, the frame may be adjusted to travel conveniently upon an inclined surface, such as a side of a hill, for instance while planting a field located upon the side of the hill or plowing the same.

A digging plow 51 is supported upon one side of the frame 1, and this digging plow is supported by the vertically extending standard 52, the standard 52 being in turn connected to an adjusting lever 53 pivotally mounted upon a standard 54. It, of course, should be understood that any suitable number of plows or cultivating devices may be supported upon the frame merely by multiplying the parts disclosed as this would not involve invention and it is not desired to limit the invention to any particular number of cultivating, planting or plowing devices which are supported upon the frame.

It should be understood that the cultivator, planter and plowing devices may be easily removed from the frame 1 when it is so desired for the purpose of allowing the device to be used as a tractor or an automobile without using the respective implements supported upon the frame. However, when it is desired, the device may be applied to the frame and may be thrown into and out of action by means of the operating levers clearly described above.

It should be of course understood that certain obvious mechanical changes may be made in the present device without departing from the spirit of the invention, so long as these changes fall within the scope of the appended claim.

What is claimed is:

In a plow of the class described, a frame having a cross bar provided with flat parallel front and rear sides, a plow standard having its upper end bifurcated to provide parallel arms, said cross bar closely fitting said bifurcated standard whereby the standard is guided vertically by said cross bar, an adjusting lever pivoted to the frame and spaced longitudinally of said frame from the standard and a link having its lower end connected to the standard below the cross bar and its upper end connected to the lever, said link being angularly disposed with relation to the standard whereby to constitute means for adjusting the height of the standard and for bracing the latter against backward movement at its lower end.

In testimony whereof I affix my signature in presence of two witnesses.

DANIEL WEBSTER.

Witnesses:
A. HARRIS,
S. F. YOUNG.